United States Patent
Nordeen et al.

(10) Patent No.: US 7,047,724 B2
(45) Date of Patent: May 23, 2006

(54) COMBUSTION IGNITION

(75) Inventors: Craig A. Nordeen, Manchester, CT (US); James W. Norris, Lebanon, CT (US); Wendell V. Twelves, Jr., Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/334,019

(22) Filed: Dec. 30, 2002

(65) Prior Publication Data

US 2004/0123583 A1 Jul. 1, 2004

(51) Int. Cl.
*F02K 3/02* (2006.01)

(52) U.S. Cl. ............... 60/226.1; 60/39.76; 60/39.38; 60/247

(58) Field of Classification Search ......... 60/226.1, 60/247, 39.76, 39.38, 804, 737, 39.821, 39.827; 431/1

See application file for complete search history.

(56) References Cited

U.S. PATENT DOCUMENTS

| | | | |
|---|---|---|---|
| 2,557,198 A | 6/1951 | Nichols | |
| 2,748,564 A | 6/1956 | Marchal et al. | |
| 2,888,803 A | 6/1959 | Pon | |
| 2,930,196 A | 3/1960 | Hertzberg et al. | |
| 3,417,564 A * | 12/1968 | Call | 60/39.34 |
| 3,792,584 A | 2/1974 | Klees | |
| 4,314,444 A | 2/1982 | Putnam et al. | |
| 4,570,438 A | 2/1986 | Lorenz | |
| 4,619,601 A * | 10/1986 | Sumitani | 431/1 |
| 5,218,816 A | 6/1993 | Plemmons et al. | |
| 5,419,118 A * | 5/1995 | McSpadden et al. | 60/250 |
| 5,473,885 A | 12/1995 | Hunter, Jr. et al. | |
| 5,494,004 A * | 2/1996 | Hunter, Jr. | 122/395 |
| 5,557,926 A * | 9/1996 | Hunter et al. | 60/247 |
| 5,579,633 A | 12/1996 | Hunter, Jr. et al. | |
| 5,800,153 A * | 9/1998 | DeRoche | 431/1 |
| 5,864,517 A * | 1/1999 | Hinkey et al. | 367/145 |
| 5,899,660 A | 5/1999 | Dodd | |
| 5,937,635 A | 8/1999 | Winfree et al. | |
| 6,349,538 B1 * | 2/2002 | Hunter et al. | 60/204 |
| 6,442,930 B1 | 9/2002 | Johnson et al. | |
| 6,449,939 B1 * | 9/2002 | Snyder | 60/776 |
| 6,477,829 B1 * | 11/2002 | Hunter et al. | 60/225 |
| 6,484,492 B1 * | 11/2002 | Meholic et al. | 60/247 |
| 6,516,605 B1 * | 2/2003 | Meholic | 60/247 |
| 6,550,235 B1 * | 4/2003 | Johnson et al. | 60/204 |
| 6,584,761 B1 * | 7/2003 | Hunter, Jr. | 60/204 |
| 2002/0139106 A1 | 10/2002 | Meholic | |
| 2003/0182927 A1* | 10/2003 | Leyva | 60/247 |
| 2004/0000134 A1* | 1/2004 | Tew et al. | 60/247 |
| 2004/0112060 A1* | 6/2004 | Kraft | 60/776 |

FOREIGN PATENT DOCUMENTS

| | | |
|---|---|---|
| DE | 690569 | 4/1940 |
| DE | 19850812 | 8/2000 |
| GB | 710252 | 6/1954 |
| GB | 756288 | 9/1956 |

* cited by examiner

*Primary Examiner*—William H. Rodriguez
(74) *Attorney, Agent, or Firm*—Bachman & LaPointe, P.C.

(57) ABSTRACT

Distributed initiation (e.g., multipoint or continuous) is utilized to obtain constant volume-like combustion performance in a pulse combustion device in the absence of detonation. A number of such devices may be utilized as turbine engine combustors.

20 Claims, 6 Drawing Sheets

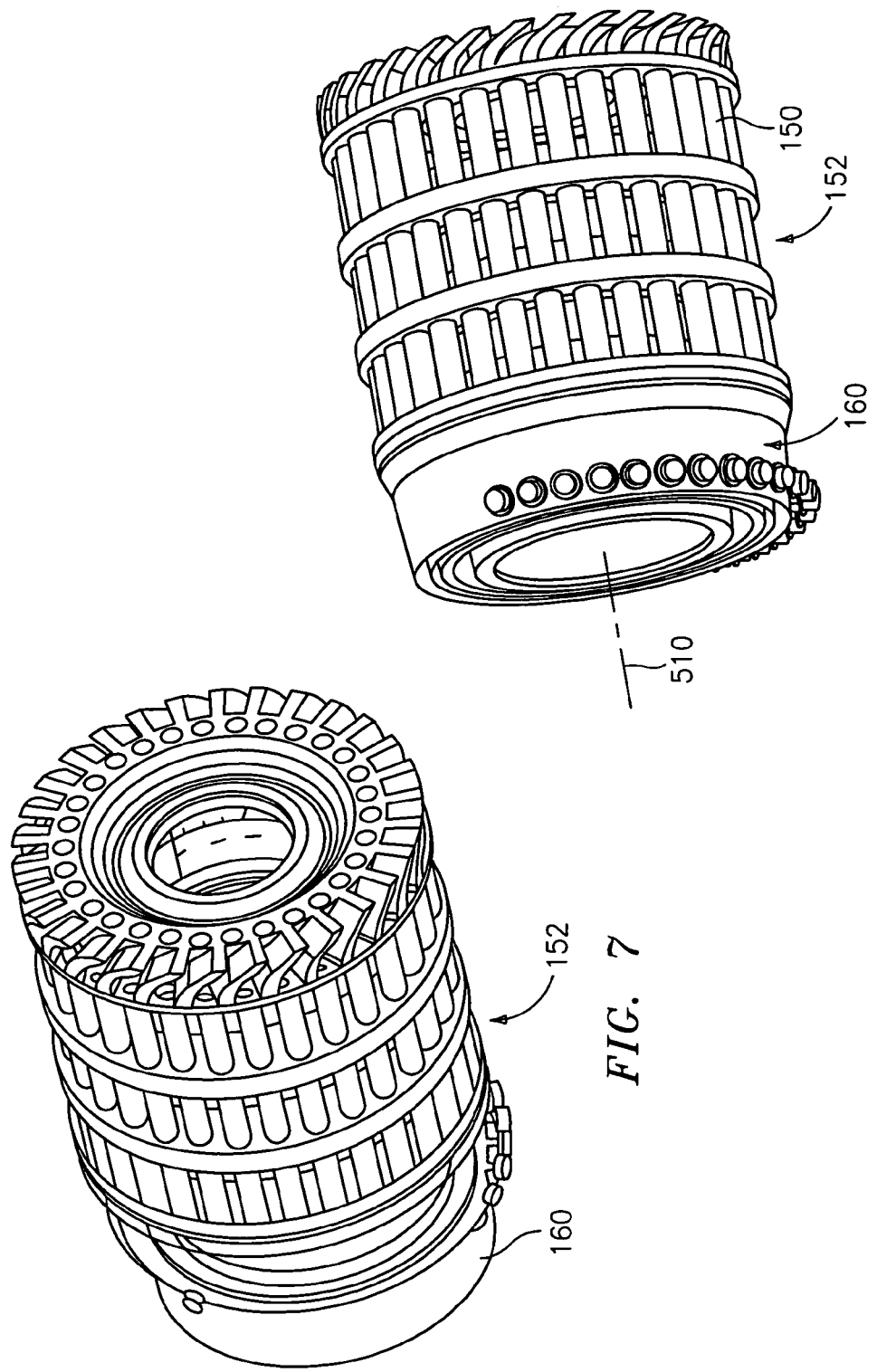

COMBUSTION IGNITION

BACKGROUND OF THE INVENTION (1) Field of the Invention

This invention relates to pulse combustion devices, and more particularly to pulsejet engines and hybrid pulse combustion and turbine engines.

(2) Description of the Related Art

Diverse pulse combustion technologies exist. Pulse detonation engines (PDE's) represent areas of particular development. In a generalized PDE, fuel and oxidizer (e.g. oxygen-containing gas such as air) are admitted to an elongate combustion chamber at an upstream inlet end, typically through an inlet valve as a mixture. Upon introduction of this charge, the valve is closed and an igniter is utilized to detonate the charge (either directly or through a deflagration to detonation transition). A detonation wave propagates toward the outlet at supersonic speed causing substantial combustion of the fuel/air mixture before the mixture can be substantially driven from the outlet. The result of the combustion is to rapidly elevate pressure within the chamber before substantial gas can escape inertially through the outlet. The effect of this inertial confinement is to produce near constant volume combustion as distinguished, for example, from constant pressure combustion.

Detonation ignition, however, has several disadvantages. Achieving reliable detonation imposes complexity costs. These arise from a need for close control over parameters such as pressure, temperature, fuel droplet size, and fuel distribution as well as related use of complex initiator and combustor geometry, and the addition of supplemental accelerants such as oxygen. There may be operational drawbacks including noise and vibration, high operating temperatures and pressures, and nitrous oxide emission.

PDE technology has a variety of applications. A traditional application is pulsejet engines. Certain recent applications involve use in turbine or hybrid engines. U.S. Pat. No. 6,442,930 and earlier patents identify several hybrid applications. These include uses as thrust augmentors and as replacements for conventional continuous constant pressure turbine combustors.

BRIEF SUMMARY OF THE INVENTION

Accordingly, one aspect of the invention is a pulse combustion device having a vessel with a gas inlet and a gas outlet. A valve opens and closes the inlet to admit a charge of gas. The device includes means for producing a distributed ignition of the gas along a flow path within the vessel. The ignition occurs substantially via deflagration. The ignition may be multipoint, continuous, and/or multi-continuous.

A number of such devices may be utilized as a combustor of a turbine engine.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 6 is a first isolated isometric view of a combustor of the engine of FIG. 5.

FIG. 7 is a second isolated isometric view of the combustor of the engine of FIG. 5.

Like reference numbers and designations in the various drawings indicate like elements.

DETAILED DESCRIPTION

Figure 1:
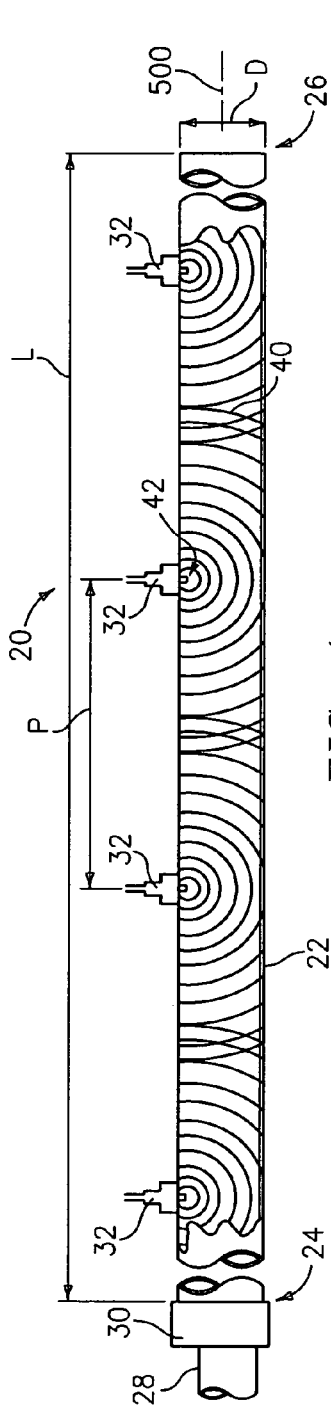
FIG. 1 is a partial schematic cutaway view of a first pulse combustion device.

FIG. 1 shows a device 20 having a containment tube 22 extending along a central longitudinal axis 500 from an inlet end 24 to an outlet end 26. The inlet end is coupled to a fuel/air conduit 28 by a valve 30. A series of igniters 32 are positioned at various locations along the tube. The tube has an overall length L and the igniters are positioned at an exemplary pitch P. The tube interior has a characteristic transverse dimension identified as a diameter D. When triggered, each igniter produces a deflagration pulse 40 which propagates a flame front radially outward from an associated ignition point 42 at a subsonic speed(e.g., under about 2,000 feet per second (fps) any typically in the vicinity of 1,000 fps). With multiple igniters, near total combustion will be achieved in the time required for the flame fronts to travel the lesser of the diameter D or one half of the pitch P. This is distinguished from a single initiation point detonation with an exemplary igniter proximate the inlet wherein substantial combustion is achieved in the time interval required for a supersonic detonation wave to travel the length of the tube. Accordingly, with a sufficiently high number of ignition points (and a sufficiently small spacing therebetween) substantial combustion can be achieved through subsonic deflagration in a sufficiently short time that may approach or even be shorter than that of the detonation system. With a short enough combustion time, the inertial confinement of the gas in the tube (the outlet being open) is effective to achieve near constant volume combustion. The resulting effect can be achievement of efficiencies similar to the detonation system without some or all of the attendant drawbacks (e.g., narrow operating parameters, supplemental oxygen, exotic chamber geometries, noise, and the like).

FIG. 1 illustrates but a rudimentary example of a multi-igniter, multi-point ignition system. Various embellishments may be made involving the positioning of the igniters and their trigger timing to achieve desired combustion parameters. In addition to discrete multi-point ignition, there may be continuous or multi-continuous ignition.

Figure 2:
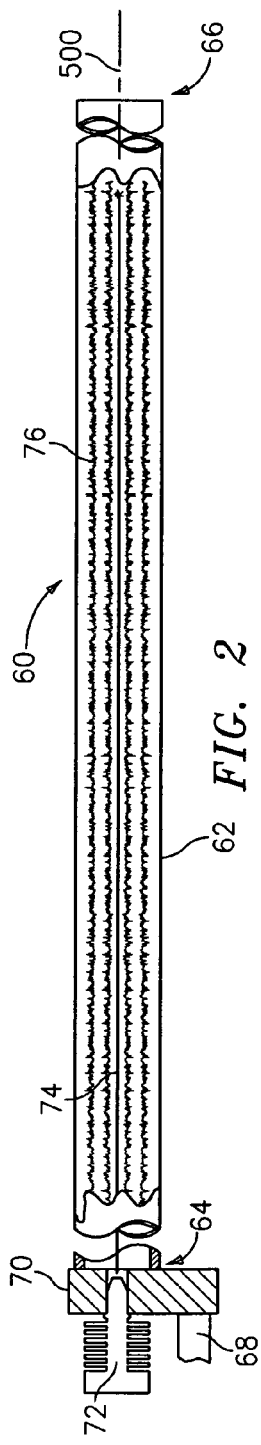
FIG. 2 is a partial schematic cutaway view of a second pulse combustion device.

FIG. 2 shows a device 60 with a tube 62 that may be otherwise similar to the tube 22 of FIG. 1. The tube 62 has inlet and outlet ends 64 and 66. The inlet end is in selective communication with a fuel/air conduit 68 via a valve 70. In the exemplary embodiment, an initiator 72 is also carried by or otherwise coupled to the valve 70 for emitting an energy beam 74. The energy beam extends from the inlet end all the way to the outlet end and beyond. As the speed of the beam may be extremely high relative to the speed of sound, the beam acts as a distributed linear ignition source along the axis 500. The resulting deflagration flame front 76 moves essentially radially away from the axis 500 and thus needs to propagate only one half of the diameter D to achieve substantial combustion. Such initiation is particularly useful with combustion chamber configurations that provide the beam with a straight path through a substantial portion of the chamber.

Figure 3:
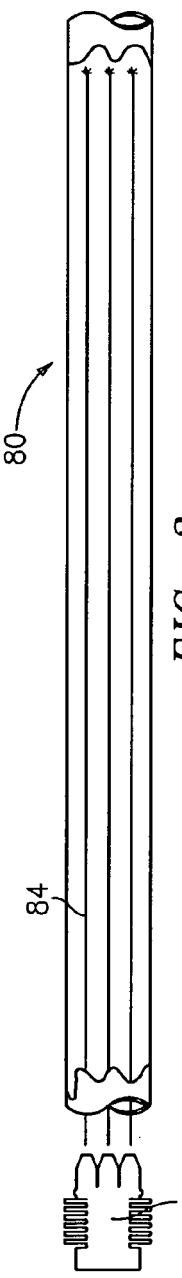
FIG. 3 is a partial schematic cutaway view of a third pulse combustion device.

FIG. 3 shows a device 80 with an initiator 82 that emits several substantially parallel beams 84 to further reduce relative combustion time.

Figure 4:
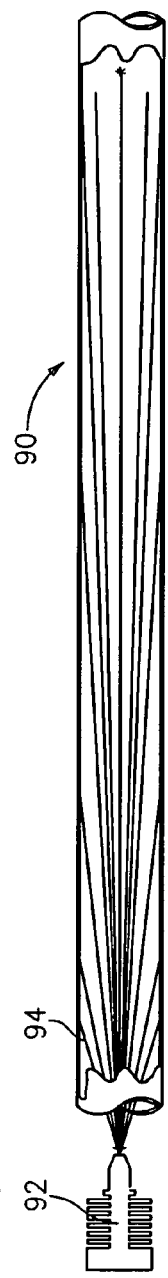
FIG. 4 is a partial schematic cutaway view of a fourth pulse combustion device.

FIG. 4 shows a device 90 with an initiator 92 that sweeps a beam 94 through a volume of the chamber at a sufficiently high sweep speed to further reduce the characteristic combustion time.

The devices may operate in a broad performance envelope. Exemplary operating pressure ratios (OPR) may be between 2:1 and 30:1. The low end of the spectrum might be typical for ram-fed applications and the high end for pre-compression applications. Basic applications include use as pulsejet engines. In an exemplary ram-fed pulsejet engine, inlet air is fed into the device due to the movement of the vehicle through the air and the exhaust expelled from the outlet as thrust. Applications for such pulse combustion devices further include a variety of uses in turbine or hybrid engines. One area of hybrid engines involves utilizing the devices in place of conventional combustor technology. In certain implementations, the pulse combustion devices may be located in one or more rings about the engine. The rings may be located on a rotating carousel, the rotation of which passes each device through a first portion of a rotation during which the device is charged and to a second portion in which it is discharged, with combustion occurring between. In a given 360° of rotation there may be more than one pair of charging and discharging phases. The rotation may be driven by one of the turbine's spools or by tangential diversion of gases discharged by the devices.

Figure 5:
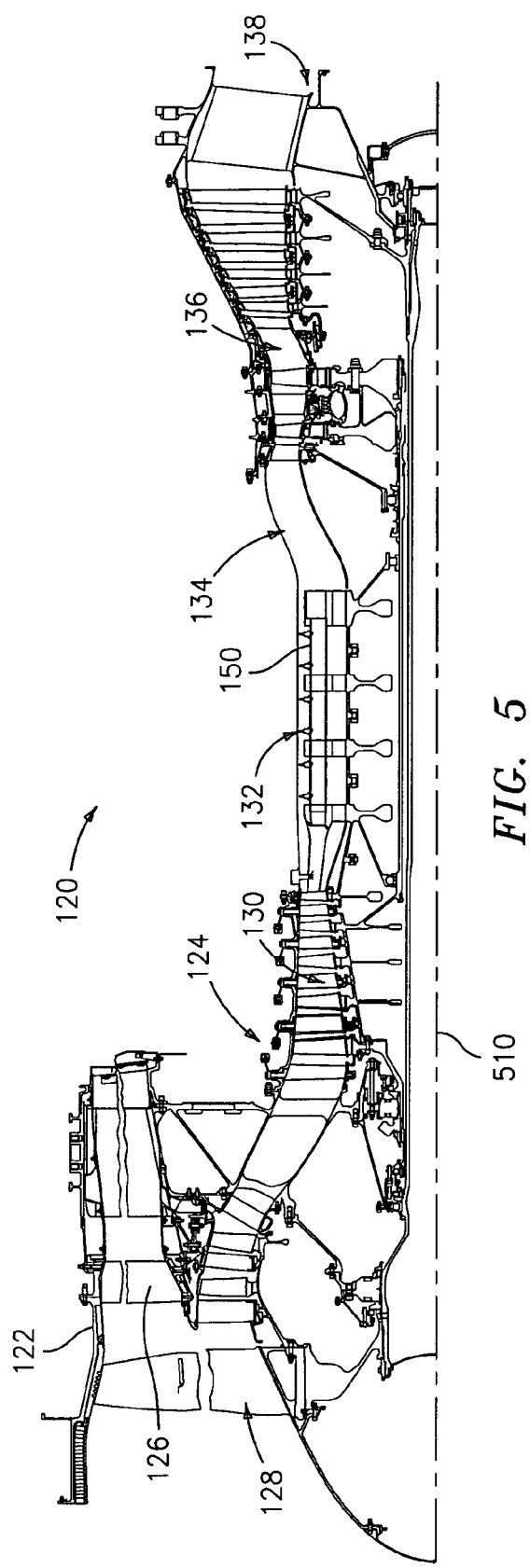
FIG. 5 is a partial longitudinal sectional view of a turbofan engine.

FIG. 5 shows a turbofan engine 120 having a duct 122 and a core 124. The duct is supported relative to the core by vanes 126. Of inlet air entering the duct, a fan 128 drives a bypass portion along a first flow path radially between the duct and the core and core portion along a second flowpath through the core. In the core downstream of the fan, a compressor section 130 having alternating rings of rotor blades and stator vanes compresses the core air and delivers it further downstream to a combustor section 132 where it is mixed with fuel and combusted. A combustor bypass portion of the core air may bypass the combustor and be mixed with the portion flowing through the combustor in a mixing duct 134 downstream of the combustor. Downstream of the mixing duct, a turbine section 136 is driven by the mixing duct output to in turn drive the compressor and fan. An augmentor 138 may be located downstream of the turbine.

Figure 8:
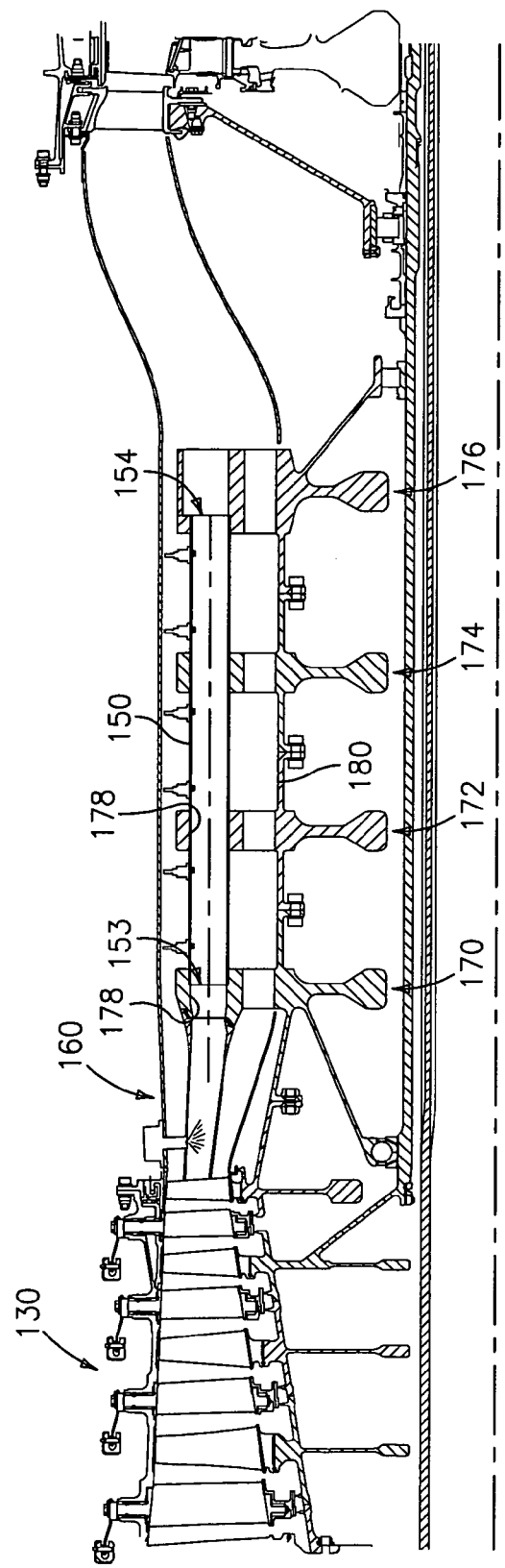
FIG. 8 is a partial longitudinal sectional view of the engine of FIG. 5 along a charging sector.
Figure 9:
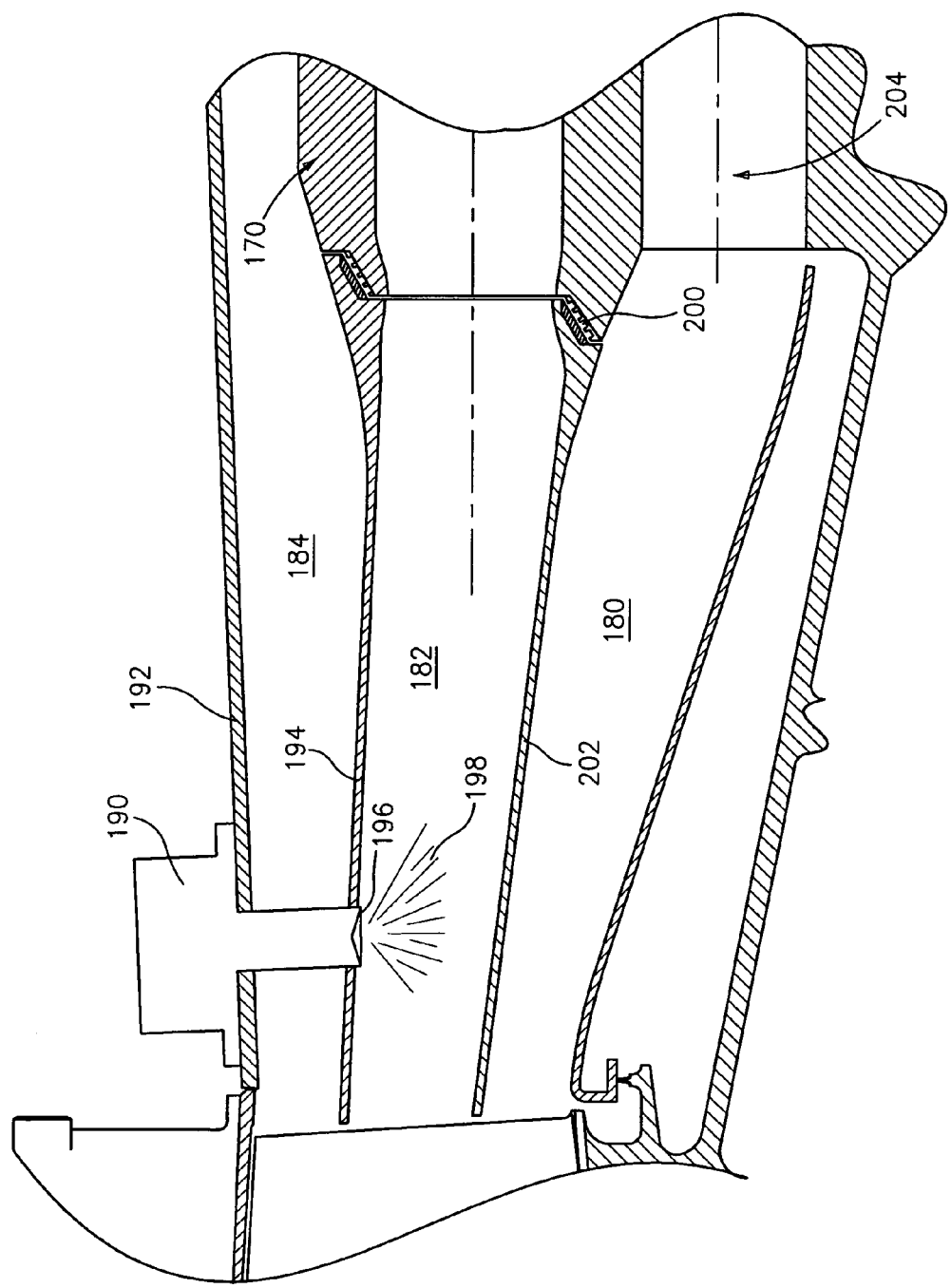
FIG. 9 is a longitudinal sectional view of a manifold of the engine of FIG. 5 along the charging sector.

The exemplary combustor includes a ring of combustion tubes 150 which may be operated as pulse combustion tubes such as those of FIGS. 1–4. Although advantageously operated as pulse deflagration tubes, a similar structure may potentially be used with pulse detonation tubes. The tubes are mounted in a carousel structure 152 (FIGS. 6 and 7) for rotation about the engine central longitudinal axis 510. Each exemplary tube 150 (FIG. 8) has a forward upstream inlet end 153 and an aft downstream outlet end 154. The tube inlet ends are proximate an aft, downstream portion of a fixed manifold 160. The exemplary carousel includes a number of disks 170, 172, 174, and 176 from fore to aft. In the illustrated embodiment and as discussed further below, the carousel forms a third free spool in addition to the high and low spools of the turbine/compressor combination. Proximate their outboard peripheries, the disks have apertures 178 into which the tubes 150 are secured. Disk platforms 180 combine to form a cylindrical inboard wall of the local core flow path. In the exemplary embodiment, along a charging sector of the manifold, the manifold 160 splits the core flow into three portions in inboard, intermediate, and outboard manifold sections 180, 182 and 184 (FIG. 9). Along this charging sector, the manifold has a circumferential array of fuel injectors 190 mounted in an outer wall 192 of the core and penetrating the outer section 184 to a wall 194 separating the sections 182 and 184. An injector outlet 196 is positioned to introduce fuel 198 into the intermediate section 182 where it mixes with that portion of the core air passing through the intermediate section. Along the charging sector, the manifold intermediate section 182 is in communication with a transiently aligned group of the tubes 150. A sealing system 200 is provided on a downstream end of the wall 194 and a downstream end of a wall 202 separating the sections 180 and 188. The sealing system cooperates with the leading disk 170 to pass the fuel air mixture from the manifold section 182 into the tubes 150 when the tubes are aligned with the charging sector. In the illustrated embodiment, the inboard manifold section 180 passes an inboard portion of the core air to the carousel where it may pass through inboard apertures 204 in the disks to bypass the tubes 150. Similarly, the manifold outboard section 184 passes an outboard portion of the core air around the outer peripheries of the disks to bypass the tubes. Once in the carousel, there may be mixing of these two bypass portions with between the disks.

Figure 10:
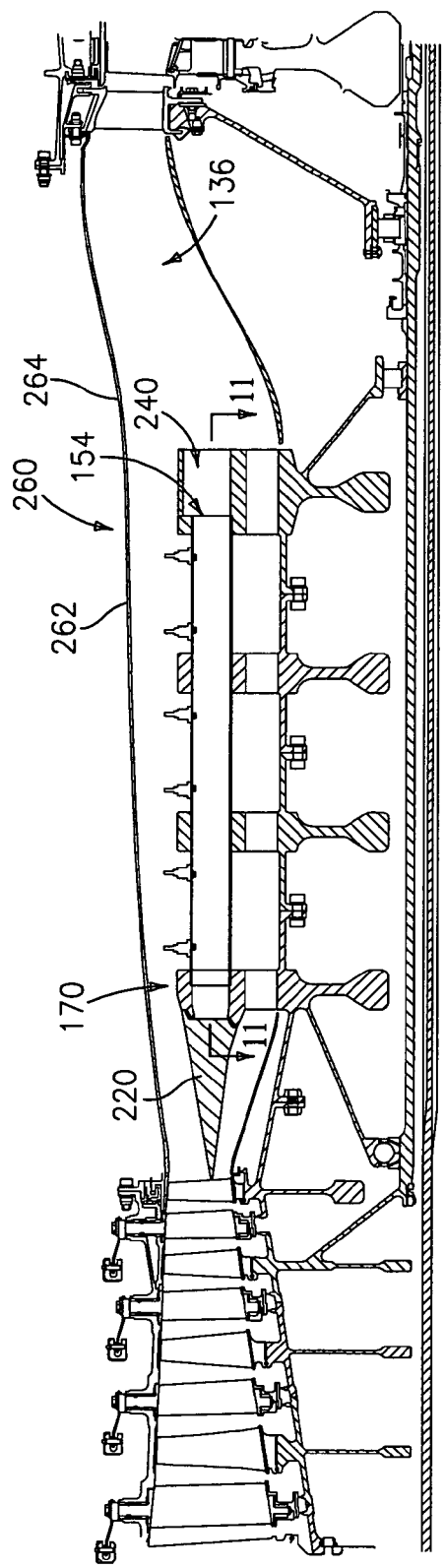
FIG. 10 is a partial longitudinal sectional view of the engine of FIG. 5 along a discharging sector.
Figure 11:
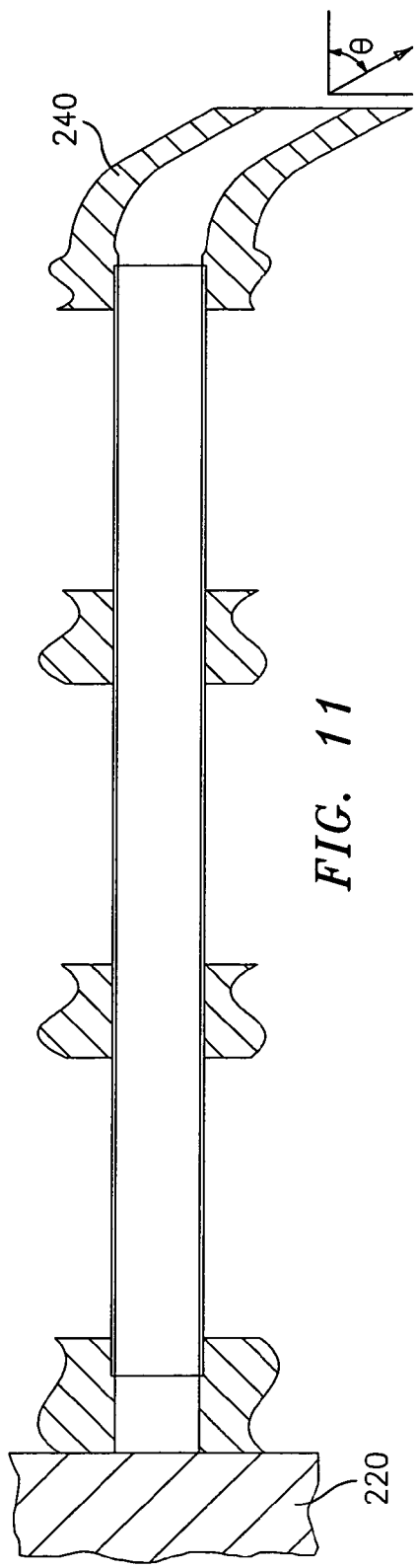
FIG. 11 is a longitudinal sectional view of a combustion tube of the engine of FIG. 5 along the discharging sector.

Outside of the charging sector, the manifold has a blocking element 220 (FIG. 10) which cooperates with the leading disk 170 to seal the inlet end of the tube 150 to create a combustion chamber. The combustion chamber is bounded by a vessel created by the tube 150, a small portion of the disk 170 thereahead and an aft blocking surface portion of the element 220. Ignition and discharge may occur when each tube is so sealed. Along this ignition/discharging sector, the exemplary manifold separates the core air flow into inboard and outboard flows bypassing the tubes in similar fashion to the bypassing flows of the charging sector. Combustion gases discharge from the tube outlet 154 encounter turning vanes 240 which may be unitarily formed with the aft carousel disk 176. In the exemplary embodiment, an equal number of turning vanes 240 are alternatingly interspersed with the tubes 150. Adjacent vanes divert the discharge from the tubes by an angle θ (FIG. 11) relative to the tube axis and local longitudinal centerplane of the engine. In the exemplary embodiment, this diversion applies sufficient torque to the carousel to rotate the carousel at a desired rotational speed. In an exemplary three spool engine, an exemplary steady state rotational speed of the carousel is 2,000–18,000 RPM. The specific operating range will be influenced by engine dimensional considerations in view of carousel structural integrity and the number of charge/discharge cycles per rotation. A narrower range of 6,000–12,000 target RPM is likely with the lower third of this range more likely for a two cycle/rotation engine and the upper third for a one cycle/rotation engine. In operation, these speeds will likely be substantially lower than the high spool speed and approximately the same or moderately lower than the low spool speed. An initial rotation may be provided by the engine starter motor or by a dedicated starter motor for the combustor.

The discharge flow is mixed with the combustor bypass flows before encountering the turbine. In the exemplary embodiment, an outboard portion of the flow passing over the trailing disk 176 may at least partially mix with a discharge flow along the vanes 240. An inboard portion passing through the apertures 204 in the trailing disk may mix further downstream in the mixing duct 136.

The core outer wall 192 has a locally radially elevated section or hump 260 (FIG. 10) with a first portion 262 extending aft from near a forward end of the carousel and a second portion 264 extending further rearward along a forward portion of the mixing duct 136. Portions of the outer wall fore and aft of the hump are of more even radial position about the circumference of the core. The hump is associated with the discharging sector. The hump is shaped to drive a large percentage of the core bypass flow volume to the vicinity of the firing combustor tubes. The hump provides a non-uniform cross section for increased cross sectional flow area in the firing discharge zone of a mixing plane. The large volume of relatively cool core air that bypasses the combustor tube mixes with and reduces the temperature of the exhaust effluents. The cross-section of the duct transitions to a uniform cross-section prior to reaching the turbine face. The transition geometry forces core bypass and exhaust gas mixing and uniform distribution of the mixed gases around the circumference of the duct.

The hump and mixing duct geometry and the volume between the turning vanes and the turbine face serve three primary functions: 1) to diffuse the high velocity exhaust gases to a useable pressure rise compatible with the engine through flow requirements; 2) to mix out and transition localized hot, high velocity exhaust effluents and cool core by-pass air to a uniform (or nearly uniform) pressure, velocity and temperature flow of gas at the turbine face; and 3) act as a pressure pulse dampener to smooth out the flow presented to the turbine. An exemplary hump may be disposed helically in accordance with the helical velocity component of exhaust gases exiting the combustor.

In exemplary embodiments, there may be between 4 and 60 combustion tubes, more narrowly, 20 and 40. Exemplary tube lengths(and the approximately similar combustion chamber lengths) are between 6 inches and 40 inches, more narrowly, 12 inches and 30 inches. The exemplary tube cross sectional areas are between 1.0 inch$^2$ and 20 inch$^2$, more narrowly, 2.0 inch$^2$ and 8 inch$^2$. An exemplary discharging sector is between 5° and 120°, more narrowly, 10° and 100°. However, the key limitation regarding the charging sector is the time required to charge the combustion tubes at a given radius from the engine centerline and rotational speed. As described above, this gives rise to the possibility of multiple charge/discharge cycles during one 360° rotation of the carousel. In such a situation there could be multiple charging and discharging sectors, humps, and the like. Thus for an exemplary single cycle per rotation configuration, an exemplary discharging sector would be 80–120° with the substantially complementary charging sector being 240–280°.

The magnitude of the pressure pulses from the individual combustion tubes is minimized by the apparent high firing frequency (e.g., 1000 Hz to 6000 Hz) provided by the rotating tube pack. The pressure pulses may overlap at a relatively uniform peak level resulting in a quasi-steady state effluent pressure. Additional viscous dampening of any residual small cyclical pressure variations occurs in the volume of the duct as the core bypass and combustor tube exhaust gases mix together. The mixed gases are then expanded through the turbine.

If sealing the inlet ends of the conduit is impractical in view of cost and durability considerations, alternative embodiments involve providing the blocking portion with a unshaped passageway, one leg of which communicates with the tube inlet and the other leg of which communicates with an auxiliary at least partially longitudinal exhaust conduit. Such exhaust conduit may be mounted to the carousel or fixed and external thereto. Upon ignition of the charge in the combustion conduit, the combustion products are expelled both from the combustion tube outlet and from the inlet. The latter flow of combustion products may flow through the exhaust conduit and, for example, join the remainder at an outlet of such exhaust conduit proximate the combustion tube outlet. This reduces the pressure loads on the seal between the manifold and carousel.

One or more embodiments of the present invention have been described. Nevertheless, it will be understood that various modifications may be made without departing from the spirit and scope of the invention. For example, the details of any particular application will influence the configuration of the combustion devices. Various features of the combustor may be fully or partially integrated with features of the turbine or the compressor. Accordingly, other embodiments are within the scope of the following claims.

What is claimed is:

1. A pulse combustion device comprising:
    a vessel having a gas inlet and a gas outlet;
    a valve for opening and closing the inlet to admit a charge of gas; and
    means for producing a distributed ignition of said gas along a flow path within the vessel to initiate combustion of said gas, the combustion occurring substantially via deflagration.

2. The device of claim 1 wherein the vessel has a length along a flow path between the inlet and outlet, said length being at least 1.5 times a square root of a median cross-sectional area.

3. The device of claim 1 wherein the vessel consists in major part of a tube of substantially uniform circular section having a length at least 1.5 times a characteristic internal diameter.

4. The device of claim 1 operating under an operating pressure ratio of between 2:1 and 30:1.

5. A turbofan engine comprising:
    a fan;
    a compressor;
    a pulse combustion combustor receiving air from the compressor and outputting combustion gasses and having:
        a plurality of elongate combustion chambers each having a gas inlet and a gas outlet; and
        means for producing a distributed ignition of said gas along a flow path within the combustion chambers, the ignition occurring in the absence of detonation; and
    a turbine receiving the combustion gasses and driving the compressor and fan.

6. The engine of claim 5 operating under conditions of an operating pressure ratio of between 2:1 and 20:1.

7. The engine of claim 5 operating under conditions of an operating pressure ratio of between 10:1 and 20:1.

8. The engine of claim 5 comprising at least 8 such combustion chambers.

9. The engine of claim 5 wherein said combustion chambers each comprise a tube and said tubes are carried for operational rotation as a unit about a central longitudinal axis of the engine.

10. The turbofan engine of claim 5 wherein the pulse combustion combustor comprises means for opening and closing said gas inlets of said combustion chambers while said gas outlets remain open.

11. A pulsed combustion device comprising:
a vessel having an upstream gas inlet and a downstream gas outlet;
valve for opening and closing the inlet to admit a charge of gas; and
an ignition system selected from the group consisting of:
  a plurality of igniters distributed at a plurality of locations from upstream to downstream along an upstream to downstream length of the vessel; and
  an energy source directing at least one beam in a generally upstream or downstream direction relative to a flow of said gas from the gas inlet to the gas outlet.

12. The device of claim 11 wherein the igniters are electric spark igniters.

13. The device of claim 11 comprising the energy source and wherein the energy source is selected from the group consisting of lasers, microwave sources, electron beam sources, and plasma beam sources.

14. The device of claim 11 operating under conditions of an operating pressure ratio between 2:1 and 20:1.

15. A pulsed combustion device comprising:
a vessel having an upstream gas inlet and a downstream gas outlet;
a valve for opening and closing the inlet to admit a charge of gas; and
an ignition system comprising:
  a plurality of igniters distributed at a plurality of locations from upstream to downstream along the vessel, including at least a first such igniter in an upstream 1/3 of a length of the vessel and a second such igniter in a downstream 1/3 of the length of the vessel.

16. A pulsed combustion device comprising:
a vessel having an upstream gas inlet and a downstream gas outlet;
a valve for opening and closing the inlet to admit a charge of gas; and
an ignition system comprising:
a plurality of igniters distributed at a plurality of locations from upstream to downstream along the vessel, including at least three such igniters positioned at intervals no larger than 1/2 of a length of the vessel.

17. The device of claim 16 wherein there are at least four such igniters positioned at intervals no larger than 1/3 of a length of the vessel.

18. An engine comprising:
a compressor;
a pulse combustion combustor receiving air from the compressor and outputting combustion gasses and having:
  a vessel having an upstream gas inlet and a downstream gas outlet;
  a valve for opening and closing the inlet to admit a charge of gas;
  an ignition system comprising one, but not both, of:
    a plurality of igniters distributed at a plurality of locations from upstream to downstream along an upstream to downstream length of the vessel; and
    an energy source directing at least one beam; and
a turbine receiving the combustion gasses and driving the compressor.

19. An engine comprising:
a compressor;
a pulse combustion combustor receiving air from the compressor and outputting combustion gasses and having:
  a plurality of elongate combustion chambers each having a gas inlet and a gas outlet; and
  means for producing a distributed ignition of said gas along a flow path within the combustion chambers, the ignition occurring in the absence of detonation; and
a turbine receiving the combustion gasses and driving the compressor.

20. A pulse combustion device comprising:
a vessel having a gas inlet and a gas outlet;
a valve for opening and closing the inlet to admit a charge of gas; and
means for producing a distributed ignition of said gas along a flow path within the vessel, the ignition occurring substantially via deflagration wherein combustion occurs in the absence of detonation.

* * * * *